Nov. 24, 1959 A. H. JOHNSTON ET AL 2,914,398
RECOVERY OF ALUMINUM IN SUBHALIDE DISTILLATION
Filed Aug. 9, 1957
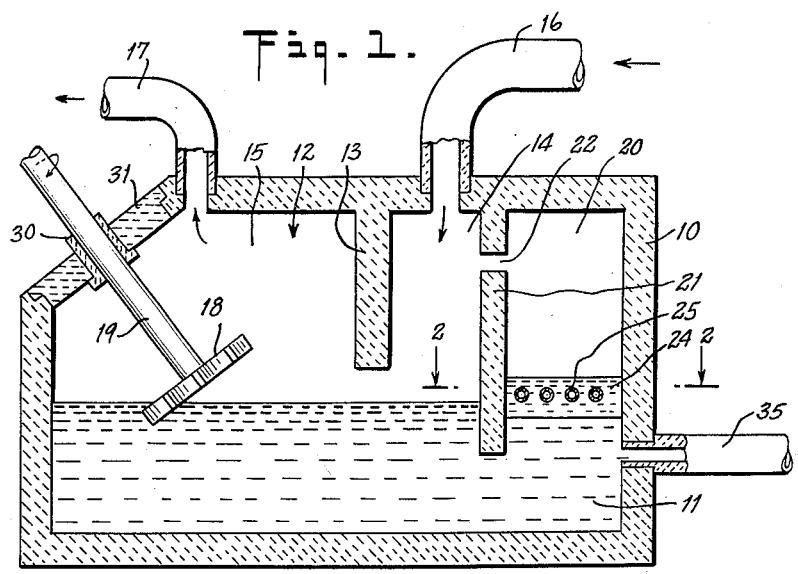
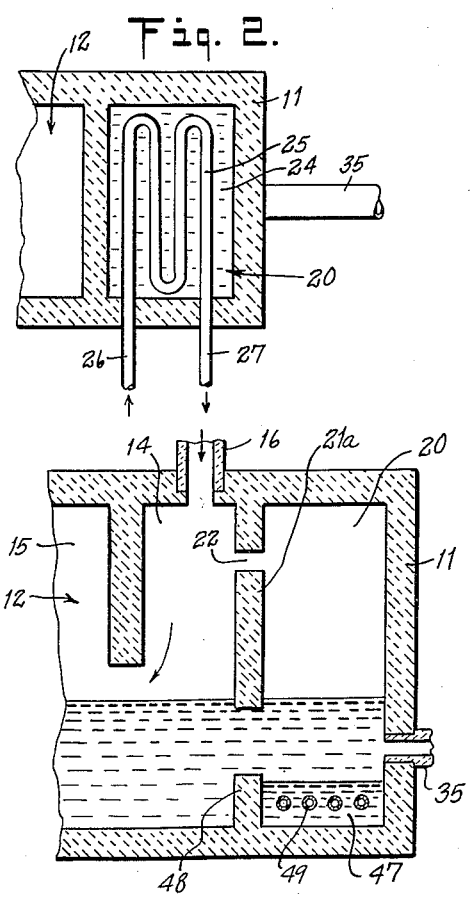
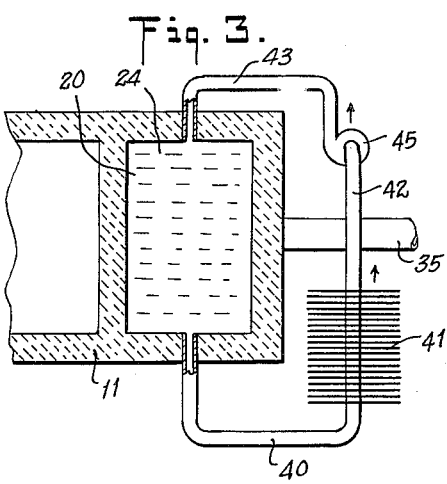
INVENTORS
ALAN H. JOHNSTON
FREDERICK WILLIAM SOUTHAM
BY Robert S. Dunham
ATTORNEY United States Patent Office 2,914,398
Patented Nov. 24, 1959

2,914,398
RECOVERY OF ALUMINUM IN SUBHALIDE DISTILLATION

Alan H. Johnston and Frederick William Southam, Arvida, Quebec, Canada, assignors to Aluminum Laboratories Limited, Montreal, Quebec, Canada, a corporation of Canada Application August 9, 1957, Serial No. 677,318

6 Claims. (Cl. 75—68)

This invention relates to the so-called subhalide distillation of aluminum, e.g. from metallic materials or compositions which contain aluminum and other metals, and in a more particular sense, the present improvements are related to the recovery of metallic aluminum from the subhalide gas or vapor. In such procedure, which is also sometimes called a catalytic distillation, the impure or contaminated aluminum-bearing material is treated to yield a gaseous subhalide of aluminum, at an elevated temperature, and the gas comprising the subhalide is conducted to a condenser where a reverse chemical reaction occurs, involving dissociation of the subhalide to yield relatively pure aluminum metal, together with normal aluminum halide which is separable or separated, e.g. preferably remaining in gaseous form and being conducted away from the condenser. The present invention is designed to provide improved apparatus and procedure for recovering metallic aluminum, i.e. in molten form, from the subhalide gas by the described reaction of dissociation or decomposition, the apparatus or condenser used for this operation being conveniently called a decomposer.

In a preferred way of carrying out the subhalide distillation process, the metallic material is treated in a suitable converter where it is heated and where a halide in gaseous state is brought into contact with it, for example aluminum trichloride or tribromide, i.e. $AlCl_3$ or $AlBr_3$, also commonly called aluminum chloride or aluminum bromide. At appropriate temperature, ordinarily in the range of 1000° C. and upwards, and under suitable pressure, which may be atmospheric or subatmospheric, the gaseous halide reacts with the aluminum in the material to produce in gaseous form an aluminum subhalide, e.g. a monohalide. Thus where the treating vapor is aluminum trichloride the gas conducted from the converter contains at least a considerable proportion of aluminum monochloride.

The converted gas, which may also contain some unreacted halide, is led to the decomposing region where a suitably lower temperature is maintained, so that the reverse reaction occurs, with the subhalide reverting to aluminum and normal aluminum halide. The metallic aluminum is collected, while the gaseous normal halide is carried along for recovery and reuse. By these chemical operations called subhalide distillation, highly or relatively pure aluminum is obtainable from aluminum-containing material of much less purity.

It has been found that decomposition of the subhalide and deposit of pure aluminum in molten form can be effectively achieved in a decomposer arranged and functioning as a so-called splash-type condenser, wherein the gas is brought into vigorous contact with molten aluminum, e.g. traveling through a more or less continuing splash, spray or shower of the molten metal, so that the extended surface of the latter exerts the necessary cooling effect on the gas, to produce the reverse or decomposing reaction to an efficient extent. The operation involves the maintenance of a considerable body of molten aluminum (from which the splash or shower is created) and the cooling of this body, i.e. the removal of heat therefrom so as to maintain the desired temperature for the decomposing reaction. In conventional splash condensers for other purposes, heat removal is effectuated by coolant coils, shells or the like traversing the molten metal at an appropriate locality, or sometimes disposed in the splash space. It has now been found, however, that difficulty arises in the above aluminum subhalide decomposing operation, in that the pipes or tubes, such as steel pipes, which have sufficient mechanical strength and adequate thermal conductivity to be used for the cooling means, tend to dissolve in the molten aluminum, with consequent contamination of the latter.

In accordance with the present invention, which is designed to overcome the above difficulty and to provide improved procedure and apparatus for decomposing said subhalide vapor, the condensing or decomposing operation is effected by bringing the vapor into intimate contact with the molten aluminum at and above one locality of a body of the latter, and cooling the molten body, i.e. so as to maintain it at proper temperature for the decomposing or condensing reaction of the vapor, by maintaining a quantity of molten salt in intimate, heat-exchange contact with the molten aluminum at another locality, while removing heat from the molten salt. In one specially advantageous form of the invention, the molten salt is maintained in a body that floats on the molten aluminum at a locality which is essentially isolated from the path of the subhalide vapor, while the metal is circulated between the condensing or decomposing region and the vicinity of the salt body. Cooling of the molten salt can be effected in a suitable way which avoids exposure of cooling pipes or other heat-exchange elements to the metallic aluminum. For example, cooling coils or the like can be submerged in the molten salt, or the salt circulated through external cooling means.

An alternative procedure is to use a molten salt which is heavier than the aluminum; in such case, the molten salt may be confined in a well or in an otherwise partitioned region at the bottom of one portion of the molten aluminum body, with corresponding provision for removing heat from the salt.

The molten aluminum, as stated, is circulated between the localities of subhalide decomposition and of cooling by the molten salt, for efficiently removing the heat which is extracted by the decomposing or dissociating reaction. As the operation proceeds, molten aluminum may be continuously or intermittently withdrawn from the body of such metal, to constitute the desired product of the decomposer.

By way of example, the drawing shows certain forms of apparatus wherein the invention is embodied and performed.

Referring to the drawing:

Fig. 1 is a vertical longitudinal section of one form of such apparatus, shown in highly simplified and somewhat diagrammatic manner;

Fig. 2 is a fragmentary horizontal section on line 2—2 of Fig. 1;

Fig. 3 is a fragmentary horizontal section, similar to Fig. 2, showing a modified cooling arrangement; and Fig. 4 is a fragmentary vertical section, similar to Fig. 1, illustrating another embodiment of the invention.

Referring to Figs. 1 and 2, the apparatus comprises a closed vessel 10, made of or lined with suitable refractory material, i.e. material mechanically appropriate for the purpose and essentially inert to deterioration by molten aluminum and aluminum halides at the temperatures involved, examples of such material being carbon, graphite, alumina-type refractories, and the like. The vessel is constructed to hold a substantial body of high purity molten aluminum 11, e.g. to a level as shown, throughout its bottom portion, so that the surface of the molten aluminum is exposed in the decomposing section or space generally designated 12. The decomposing chamber 12 is conveniently provided with downwardly projecting baffle means or the like, such as the baffle 13 shown, which divides the chamber into an inlet section 14 and an outlet or splash section 15. Thus aluminum subhalide gas introduced through an inlet conduit 16 at the top of the chamber section 14 passes into the latter, beneath the baffle 13, which is made of material similar to the walls 10, and thence through the section 15 to an outlet conduit 17 at the top.

A rotary agitator or impeller 18, mounted on a drive shaft 19 and dipping partly into the molten aluminum, maintains a substantially continuous shower or spray of the metal in the chamber section 15. The subhalide gas thus traverses a region where the streams and drops of the metal throughout the space, and running down the walls, provide a large surface area having a temperature substantially below that of the gas. In consequence, there is effective heat transfer from the gas to the molten metal, effectuating the desired decomposing or dissociating reaction whereby the aluminum subhalide is reconverted to normal aluminum halide and metallic aluminum. The reconverted aluminum is deposited in the splashing metal and thus accumulates in the main body of aluminum 11.

The baffle 13, if employed, separates the inlet section 14 from the violent splashing in the chamber section 15, so as to keep metal out of the inlet pipe 16 and any other passage opening into the section 14.

A cooling chamber 20 is provided at one locality of the vessel, e.g. at the end remote from the exit conduit 17, by a further baffle 21 dimensioned to project substantially below the surface of the molten aluminum 11 so as to provide a region isolated from the main flow of gas under treatment and from the turbulence or splashing in the decomposing chamber 12. This baffle, which is made of suitable refractory material like the other parts of the vessel, may have a small passage or passages 22 near its upper part, for equalization of pressure between the chambers 12 and 20.

Floating on the surface of the molten aluminum in the chamber 21, a body or layer of molten salt 24 is maintained, to remove heat from the aluminum. Heat-exchange means are provided to cool the molten salt; for example, in Fig. 1 cooling pipes 25, arranged in suitable loops or coils, are mounted to be disposed wholly within the molten salt body. Through inlet and outlet connections 26, 27, coolant fluid, such as water, is continuously circulated through the pipes 25 from an outside source, not shown.

Although separate means can be provided if desired, the rotary splash impeller 18 serves to promote circulation of the molten aluminum between the region below the decomposition chamber 12 and the cooling chamber 20, to aid the molten salt in keeping the aluminum at the desired temperature, low enough for efficient function of heat extraction for the decomposing operation in the chamber section 15. In the illustrated example of apparatus, the impeller shaft 19 projects into the chamber section 15 through a suitably sealed bearing 30 in a sloping roof portion 31 of the vessel. The shaft 19 is rotated by appropriate driving means, not shown. The impeller and shaft 19 are constructed of or coated with material having appropriate strength and suitable resistance to molten aluminum, such as graphite, boron nitride, silicon carbide or silicon nitride. The impeller 18 is of bladed or like design to produce the desired shower or cascade of metal in the region 15 and to afford a continuing closed circulation in the molten aluminum body 11 between the region 15 and the locality beneath the molten salt layer 24 in the chamber 20, to keep the metal appropriately cooled.

An outlet pipe 35, or other suitable means, may be provided for continuously or periodically removing molten aluminum from the vessel, so as to keep substantially the same level in the latter. The product which results from the decomposing action is thus in effect delivered through the pipe 35.

Advanced under the influence of a suitable pump (not shown) downstream of the outlet 17, the gas containing the aluminum subhalide is continuously passed into the chamber section 15, where it is cooled by the splashing metal and undergoes the decomposing reaction, with corresponding deposition of metallic aluminum into the bath 11. The spent gas departs through the outlet 17, and consists essentially only of the normal halide if the process operates at desired efficiency for substantially complete decomposition of subhalide. The heat removed in the decomposing reaction is absorbed by the molten aluminum 11 and from the latter is taken by the molten salt layer 24, which in effect transfers it to the circulating coolant in the pipes 25.

By way of example, the gas supplied in the conduit 16 may be derived from an appropriate converter as described above and may contain aluminum monochloride; it may also, of course, contain unreacted normal chloride, i.e. gaseous aluminum trichloride. The original conversion reaction may be effected at various temperatures and pressures, usually atmospheric or sub-atmospheric; for example, one presently preferred mode of operation is such that the temperature of the monochloride-containing gas supplied to the chamber 12 will be in the range of 1000° to 1200° C. and upwards. By the decomposing reaction on removal of heat in the chamber section 15, the aluminum monochloride (AlCl) is reconverted to aluminum trichloride and elemental aluminum. The gas discharged through the outlet 17 thus preferably consists of aluminum trichloride alone, which can be collected or otherwise processed for reuse in the conversion treatment.

The temperatures of the aluminum body 11 and the salt layer 24 are maintained at values suitable for their desired cooling functions, as will be readily understood. For instance if the temperature of gas entering the decomposer is 1000° to 1200° C., the molten aluminum may conveniently be kept at a temperature of 700° to 800° C., and to this end the molten salt solution 24 is preferably maintained at a temperature of 200° to 400° C., e.g. by circulation of cooling water through the pipes 25 at room temperature.

Various salts or salt mixtures, suitably inert and having appropriate melting point, may be employed for the cooling layer 24, a convenient example being a mixture of sodium chloride and aluminum trichloride, preferably in proportions to keep the material in fully molten form at a relatively low temperature and to avoid loss by vaporization. A preferred proportion of these components are the so-called equilibrium compositions, for example involving the following proportions by weight of NaCl and $AlCl_3$ for the temperatures and pressures stated:

| Salt temperature (° C.) | Pressure (atmospheres) | Salt composition | |
|---|---|---|---|
| | | Percent $AlCl_3$ | Percent NaCl |
| 330 | 1 | 77 | 23 |
| 250 | 1 | 81 | 19 |
| 200 | 1 | 84 | 16 |
| 220 | 0.4 | 80 | 20 |

Examples of other salts or salt mixtures, which have a low enough specific gravity to float on the molten aluminum, are: potassium chloride (KCl) and aluminum trichloride (AlCl$_3$); calcium chloride (CaCl$_2$) and aluminum trichloride; and lithium chloride (LiCl) and aluminum trichloride.

Fig. 3 shows another way of cooling the molten salt 24 in the chamber 20, here by externally circulating the salt mixture, in liquid form, through a pipe 40, a cooling unit 41, as of radiator type, and then through pipes 42 and 43 back to the chamber 24, i.e. at the opposite side. Such circulation is effected by suitable means such as a pump 45 in the line of pipes 42, 43.

In some cases, a molten salt or salt mixture may be used which has a higher density than the molten aluminum. Thus Fig. 4 shows an arrangement including not only a baffle structure 21a separating the chamber 20 from the decomposing chamber, but also means for retaining a submerged pool or layer 47 of molten salt separated from the turbulence of the impeller 18. While such means can be a sump or well below the normal floor level of the vessel 11, Fig. 4 shows a baffle element 48 of refractory material, aligned with the upper baffle 21a and projecting upwardly from the floor of the vessel. As in Figs. 1 to 3, suitable cooling means for the molten salt body are provided, e.g. coolant pipes 49 corresponding to the pipes 25.

The procedure for Fig. 4 is essentially the same as described; the decomposition is effected in the splash chamber section 14, and the molten aluminum is circulated by the impeller (as in Fig. 1) into heat-exchange relation with the molten salt 47 to carry away the heat of the decomposing reaction. An example of a suitable salt mixture, suitably inert to liquid aluminum, having a greater density than the latter, is barium bromide and aluminum tribromide, e.g. in the proportions by weight of 28% BaBr$_2$ and 72% AlBr$_3$.

While in some cases, especially with the arrangements of Figs. 1 to 3, the vessel portion holding the molten salt can be open to the atmosphere and the baffle 21 will then be imperforate, the arrangement of the closed chamber 20 with the pressure-equalizing aperture 22 is advantageous and indeed is usually necessary where the subhalide-containing gas is produced and supplied at a pressure substantially below atmospheric.

The described procedures and apparatus afford an effective way of recovering aluminum by decomposition of the subhalide such as aluminum monochloride or aluminum monobromide in gaseous form, while efficiently removing the heat of decomposition and while avoiding exposure of the aluminum to coolant means which might contaminate it.

It is to be understood that the invention is not limited to the specific forms herein shown and described, but may be carried out in other ways without departure from its spirit.

We claim:

1. Procedure for recovering metallic aluminum from aluminum subhalide gas, comprising establishing a body of molten aluminum, conducting the gas into vigorous contact with molten aluminum at one locality of said body, and removing heat from the molten aluminum to reduce the temperature of the gas which comes into said contact, for decomposing the gas to deposit aluminum in the body, by maintaining molten salt in heat-removing contact with the molten aluminum at another locality of the body, and cooling said molten salt, while confining said molten salt against flow to said first-mentioned locality and while circulating the molten aluminum through both localities to promote removal of heat therefrom by the salt.

2. Apparatus for decomposing aluminum subhalide gas to recover metallic aluminum, comprising enclosed chamber means for holding a body of molten aluminum, said enclosed chamber means having structure, including conduit means opening therein and receiving a flow of subhalide gas, for conducting said gas into intimate contact with the molten aluminum, to be cooled thereby for deposit of aluminum in the molten body, passage means extending from said chamber means for withdrawal of spent gas, means providing a second chamber adjacent the first chamber means but separate from the path of gas flow, for receiving molten aluminum from said body thereof and for receiving a body of molten salt in heat-exchange contact with the molten aluminum, said first and second chamber means having passage structure at lower parts thereof for mutual access of the molten aluminum and passage structure at upper parts thereof for pressure-equalizing communication, between the space of the first chamber above the molten aluminum and a space of the second chamber above the molten aluminum and salt, said second chamber means being entirely enclosed above the molten aluminum and salt except for said last-mentioned passage structure, and cooling means associated with said second chamber means and comprising heat-transferring structure which is arranged to be exposed on one side to the molten salt and is disposed to be separated by said molten salt from the molten aluminum, said heat-transferring structure comprising means for extracting heat from its other side, to remove heat from the molten salt, and thereby to effectuate cooling of the molten aluminum by the molten salt.

3. Apparatus as defined in claim 2, wherein the cooling means is arranged externally of both the chamber means, said heat-transferring structure comprising conduit means connected with the second chamber means at a locality thereof to be occupied by the body of molten salt, for circulating molten salt away from and back to said second chamber means, and said heat-extracting means comprising means for cooling the outer side of said last-mentioned conduit means.

4. Apparatus as defined in claim 3, wherein the second chamber means is adapted to receive molten salt of lower density than molten aluminum, and the aforesaid last-mentioned conduit means of the heat-transferring structure is disposed for receiving and returning said molten salt at a locality of the second chamber means above the body of molten aluminum.

5. Apparatus as defined in claim 2, wherein the cooling means comprises cooling vessel means constituting said heat-transferring structure, for circulation of coolant fluid therein, said cooling vessel means being disposed in said second chamber in submerged exposure to said body of molten salt and separated by the molten salt from the body of molten aluminum.

6. Apparatus as defined in claim 2, wherein the second chamber means comprises partition structure adjacent a locality at the bottom of said second chamber means, to provide a vessel for receiving molten salt of higher density then molten aluminum, said heat-transferring structure of the cooling means being disposed at said bottom locality of the second chamber means for heat-transferring operation relative to the molten salt in the vessel, below the body of molten aluminum.

References Cited in the file of this patent

UNITED STATES PATENTS

| | | |
|---|---|---|
| 2,061,250 | Perkins | Nov. 17, 1936 |
| 2,470,305 | Gross | May 17, 1949 |
| 2,625,472 | Scheuer | Jan. 13, 1953 |
| 2,754,559 | Fromson | July 17, 1956 |
| 2,781,257 | Wilkins | Feb. 12, 1957 |

FOREIGN PATENTS

| | | |
|---|---|---|
| 123,117 | Australia | Dec. 13, 1946 |

UNITED STATES PATENT OFFICE
CERTIFICATE OF CORRECTION

Patent No. 2,914,398                  November 24, 1959

Alan H. Johnston et al.

It is hereby certified that error appears in the above numbered patent requiring correction and that the said Letters Patent should read as corrected below.

In the grant, lines 2 and 3, and line 12, in the heading to the printed specification, lines 5 and 6, name of assignee, for "Aluminum Laboratories Limited", each occurrence read -- Aluminium Laboratories Limited --.

Signed and sealed this 28th day of June 1960.

(SEAL)
Attest:

KARL H. AXLINE
Attesting Officer

ROBERT C. WATSON
Commissioner of Patents